(12) United States Patent
Guibert

(10) Patent No.: US 11,940,074 B2
(45) Date of Patent: Mar. 26, 2024

(54) COMPACT AND DEMOUNTABLE FLUID CONNECTION DEVICE

(71) Applicant: A. RAYMOND ET CIE, Grenoble (FR)

(72) Inventor: Kévin Guibert, Grenoble (FR)

(73) Assignee: A. RAYMOND ET CIE, Grenoble (FR)

( * ) Notice: Subject to any disclaimer, the term of this patent is extended or adjusted under 35 U.S.C. 154(b) by 137 days.

(21) Appl. No.: 17/597,645

(22) PCT Filed: Jul. 10, 2020

(86) PCT No.: PCT/FR2020/051252
§ 371 (c)(1),
(2) Date: Mar. 24, 2022

(87) PCT Pub. No.: WO2021/009454
PCT Pub. Date: Jan. 21, 2021

(65) Prior Publication Data
US 2022/0325837 A1   Oct. 13, 2022

(30) Foreign Application Priority Data

Jul. 15, 2019 (FR) ...................................... 1907930

(51) Int. Cl.
| F16L 37/098 | (2006.01) |
| F16L 37/10  | (2006.01) |
| F16L 37/113 | (2006.01) |

(52) U.S. Cl.
CPC ......... *F16L 37/0987* (2013.01); *F16L 37/103* (2013.01); *F16L 37/113* (2013.01); *F16L 2201/10* (2013.01)

(58) Field of Classification Search
CPC ....... F16L 37/24; F16L 37/248; F16L 37/252; F16L 37/0987; F16L 37/107
See application file for complete search history.

(56) References Cited

U.S. PATENT DOCUMENTS

| 4,834,423 A | 5/1989 | De Land |
| 4,915,421 A | 4/1990 | Dennany |

(Continued)

FOREIGN PATENT DOCUMENTS

| CN | 204358318   | 5/2015 |
| EP | 1797542 B1  | 4/2012 |

(Continued)

OTHER PUBLICATIONS

International Search Report for International Application No. PCT/FR2020/051252 dated Nov. 4, 2020, 2 pages.

(Continued)

*Primary Examiner* — Zachary T Dragicevich
(74) *Attorney, Agent, or Firm* — TraskBritt

(57) ABSTRACT

A connection device for connecting a tubular connector provided with an annular collar to an item of equipment comprising a passage, the connection device comprising: —a connection end fitting connecting to the passage of the item of equipment, the connection end fitting being formed by a tubular body with a head mounted thereon, the head being provided with a through-opening and comprising an ellipsoidal annular groove; —a locking ring having at least two longitudinal flexible legs for insertion into the connection end fitting, each having an outer surface bearing at least one lug intended to engage in the annular groove in order to hold the locking ring secured to the connection end fitting. The two flexible legs can be deformed and closed on the tubular connector in order to abut their free ends against the collar when the male connector is inserted longitudinally into the locking ring.

7 Claims, 4 Drawing Sheets

(56) References Cited

U.S. PATENT DOCUMENTS

| | | | |
|---|---|---|---|
| 5,356,183 | A | 10/1994 | Cole |
| 5,799,987 | A | 9/1998 | Sampson |
| 5,890,749 | A | 4/1999 | Fukaya et al. |
| 6,173,994 | B1 | 1/2001 | Ketcham |
| 7,118,138 | B1 | 10/2006 | Rowley et al. |
| 2005/0173923 | A1 | 8/2005 | Ketcham et al. |
| 2014/0291984 | A1* | 10/2014 | Dorsch ................ F16L 37/107 |
| 2016/0025252 | A1 | 1/2016 | Tran et al. |
| 2016/0238171 | A1 | 8/2016 | Galfre' |
| 2017/0299100 | A1* | 10/2017 | Leffler ................ F16L 37/107 |
| 2019/0107234 | A1* | 4/2019 | Corbett ............... F16L 37/0987 |

FOREIGN PATENT DOCUMENTS

| | | |
|---|---|---|
| JP | 2003-194278 A | 7/2003 |
| JP | 2007-107580 A | 4/2007 |
| WO | 2016/106991 | 7/2016 |
| WO | 2017/093626 | 6/2017 |

OTHER PUBLICATIONS

International Written Opinion for International Application No. PCT/FR2020/051252 dated Nov. 4, 2020, 6 pages.

* cited by examiner

COMPACT AND DEMOUNTABLE FLUID CONNECTION DEVICE

CROSS-REFERENCE TO RELATED APPLICATIONS

This application is a national phase entry under 35 U.S.C. § 371 of International Patent Application PCT/FR2020/051252, filed Jul. 10, 2020, designating the United States of America and published as International Patent Publication WO 2021/009454 A1 on Jan. 21, 2021, which claims the benefit under Article 8 of the Patent Cooperation Treaty to French Patent Application Serial No. FR1907930, filed Jul. 15, 2019.

TECHNICAL FIELD

The present disclosure relates to a compact and demountable fluid connection device placed between an equipment and a connector in order to easily connect a fluid circulation duct. This type of device is of particular interest in the automotive field, and more specifically in the field of braking.

BACKGROUND

There is a wide variety of known connection devices between a tubular end fitting connector with an annular collar and an equipment having a through passage. The connection between these two elements is often made through the use of an additional part, which may be fastened to the equipment to hold the tubular connector.

Such devices are thus known from US20160025252, JP2007107580, US20050173923, JP2003194278, U.S. Pat. Nos. 6,173,994, 4,915,421, 4,834,423, 7,118,138, 5,890,749, 5,799,987, EP1797542, U.S. Pat. No. 5,356,183, WO2017093626, CN204358318, and US2016238171. These devices often have the drawback of being bulky or not being easily demountable, or they require the use of a special demounting tool or require one of the elements to be damaged for demounting, thus preventing its reuse.

BRIEF SUMMARY

An object of the present disclosure is to provide a compact and easily demountable connection device.

With a view to achieving this object, the subject matter of the present disclosure proposes a connection device for connecting a tubular connector defining a longitudinal direction and provided with an annular collar to an item of equipment comprising a passage, the connection device comprising:
 a connection end fitting connecting to the passage of the equipment, the connection end fitting being formed of a tubular body and a head mounted thereon provided with an opening leading into the tubular body and comprising an annular groove;
 a locking ring provided with at least two flexible longitudinal legs intended to be inserted into the connection end fitting and each having an elliptical-shaped cross section, an inner surface, an outer surface, and a free end, the outer surface bearing at least one lug intended to clip into the annular groove to keep the locking ring integral with the connection end fitting, the two flexible legs being able to deform and close on the tubular connector when the male connector is introduced longitudinally into the locking ring.

According to other advantageous and non-limiting features of the present disclosure, taken alone or in any technically feasible combination:
 the passage is circular and provided with an inner thread, and the tubular body is provided with an outer thread to secure the connection end fitting to the equipment;
 the head of the connection end fitting comprises notches to receive the lugs;
 the flexible legs have stop pieces arranged on their inner surfaces; and
 the flexible legs are arranged one opposite the other on a small axis of the ellipse.

BRIEF DESCRIPTION OF THE DRAWINGS

Other features and advantages of the present disclosure will become apparent from the following detailed description of the present disclosure with reference to the accompanying figures, in which.

DETAILED DESCRIPTION

For sake of simplicity, the same references are used for identical elements or for elements performing the same function.

Figure 1A:
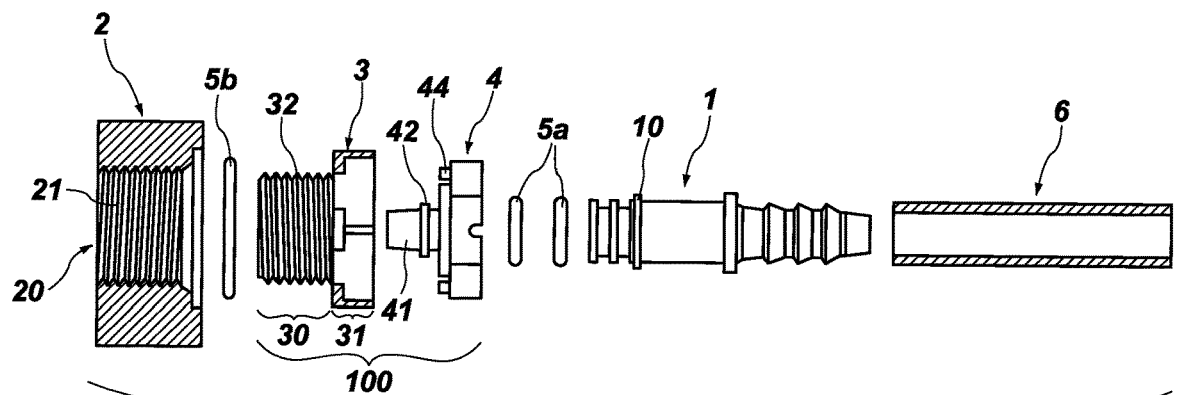
FIG. 1A shows, in exploded view, an assembly comprising a connection device according to a first embodiment.
Figure 1B:
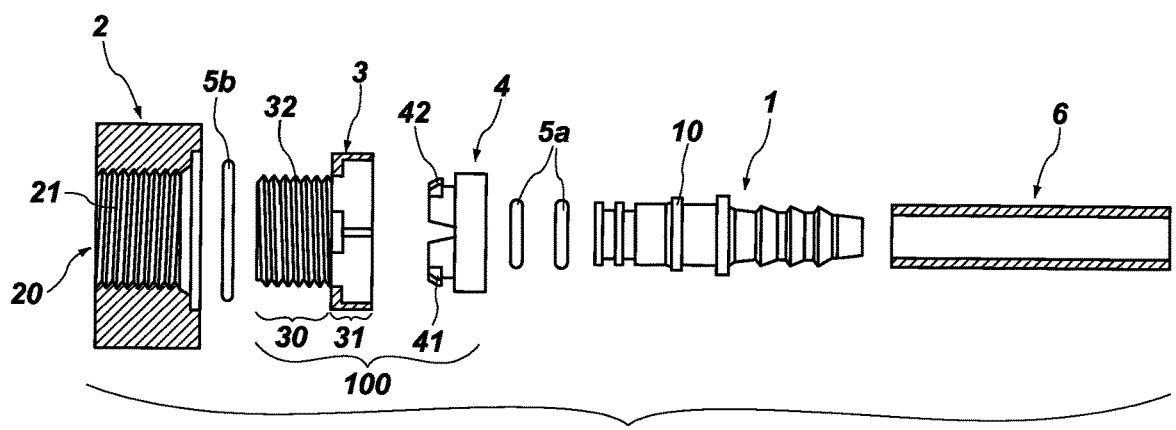
FIG. 1B shows, in exploded view, an assembly comprising a connection device according to a second embodiment.

FIGS. 1A and 1B show, in exploded view, an assembly comprising a connection device 100 conforming to a first and a second embodiment of the present disclosure, respectively.

The connection device 100 is intended to fluidly connect, in a demountable manner, a duct 6 to an item of equipment 2. For this purpose, the equipment 2 comprises a passage 20, which here is circular and provided with an inner thread 21. The fluid may be a liquid or a gas, such as compressed air.

The duct 6 is connected to a first end of a tubular connector 1, for example, by way of a mechanism of the "Christmas tree" type. The tubular connector 1 is provided with an annular collar 10 on the side of its second end intended to be inserted into the connection device 100. The tubular connector 1 defines a longitudinal direction.

The equipment 2 and/or the tubular connector 1 advantageously have seals 5a, 5b, making it possible to obtain a sealed connection between them. Thus, in the examples shown, two first seals 5a are provided, arranged in annular grooves of the tubular connector 1, upstream of its collar 10 in the direction of insertion. A second seal 5b has also been provided between the connection device 100 and the equipment 2, housed in a groove made for this purpose in the passage 20 of the equipment 2. It is also conceivable to provide seals, instead of, or in addition to, those shown in the figures, in the connection device 100.

General Description of the Connection Device

Figure 2A:
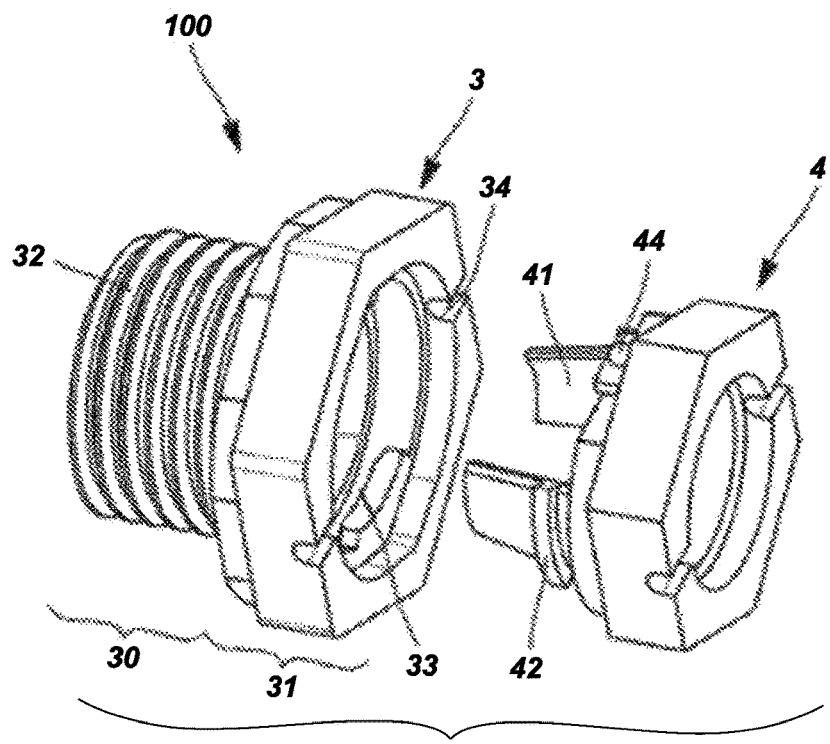
FIG. 2A shows, in exploded view, a connection device according to a first embodiment.
Figure 2B:
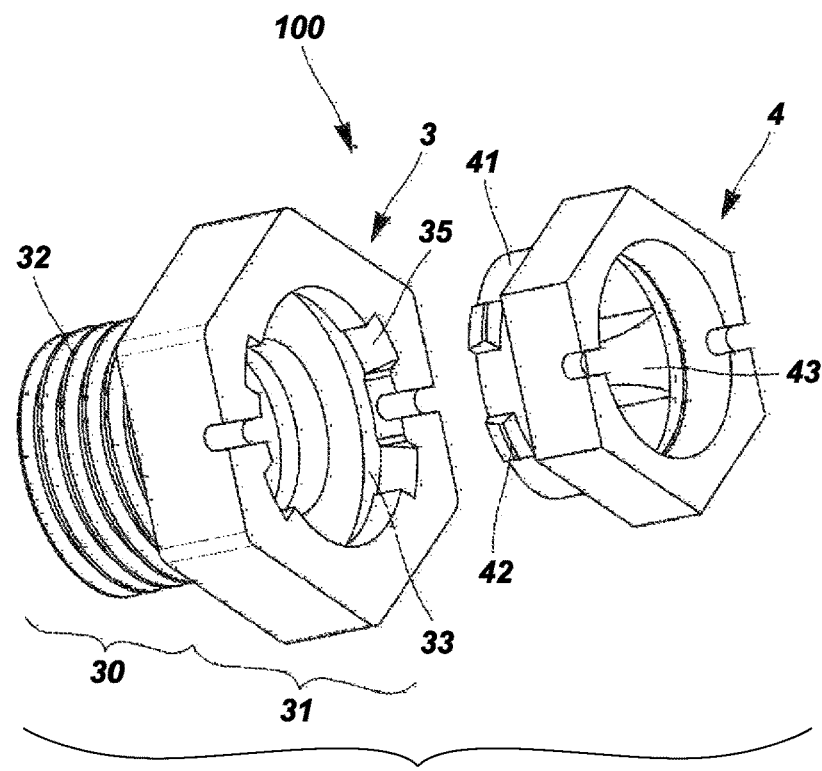
FIG. 2B shows, in exploded view, a connection device according to a second embodiment.

FIGS. 2A and 2B show an exploded view of the connection device 100 comprising a connection end fitting 3, as well as a locking ring 4, according to a first and a second embodiment, respectively. The locking ring 4 and the connection end fitting 3 are intended to be assembled together.

The connection end fitting 3 is formed of a tubular body 30 and a head 31 mounted thereon. The head 31 is provided with an opening leading into the tubular body 30. The tubular body 30 comprises, on its outer surface, an outer thread 32 configured to cooperate with the inner thread 21 of the equipment 2 and thus make it possible to attach the connection end fitting 3 to the equipment. Any other form of attachment between these two elements is possible. When the connection end fitting 3 is suitably assembled, here by screwing, on the equipment 2, the head 31 abuts against a bearing surface of the equipment 2 and remains accessible from the outside to allow, for example, its disassembly. For this reason, the head 31 of the connection end fitting 3 has a shape configured to be manipulated with a tool, which may be very conventional. The head 31 in this case has a hexagonal shape so that it may be grasped by a tool of the open-end wrench type.

The body 30 of the connection end fitting 3 has a cross section, the inner diameter of which corresponds substantially to the outer diameter of the connector 1, in order to allow their connection. As is more visible in FIGS. 3A and 3B, the body 30 has an inner shoulder in order to create a stop for the collar 10 and thus limit the insertion of the connector 1 into the connection end fitting 3.

The head 31 of the connection end fitting 3 comprises, on its inner surface, an annular groove 33 for retaining the locking ring 4, of which a detailed description will be made hereinafter with reference to each of the embodiments of the present disclosure.

Advantageously, the connection end fitting 3 is metallic in nature, for example, made of brass.

In general, the locking ring 4 is intended to retain the tubular connector 1 assembled on the connection end fitting 3 when the tubular connector 1 is introduced longitudinally into the connection device 100 to fluidly connect the duct 6 to the equipment 2.

The locking ring 4 has a main part provided with at least two flexible longitudinal legs 41 intended to be inserted into the connection end fitting 3. These flexible legs 41 each have an inner surface, an outer surface, and a free end. The outer surface has at least one lug 42 intended to interact with the retaining means 33 of the end fitting 3 in order to assemble these two elements together. In this configuration, the flexible legs 41 remain free to deform in a space provided in the end fitting 3. The main part of the ring 4 protrudes from the end fitting 3, which makes it easily accessible to be manipulated from the outside, for example, to allow the ring to be demounted. Like the head 31 of the end fitting 3, the main part of the locking ring 4 has a shape configured to be manipulated with a tool that may be very conventional, which in this case is also a hexagonal shape.

When the tubular connector 1 is inserted longitudinally into the connection device 100, the flexible legs 41 of the locking ring 4 may thus be deformed to allow the collar 10 to advance and close thereon. The collar 10 is thus placed between stops formed by the free ends of the flexible legs and by the inner shoulder of the connection end fitting 3.

The locking ring 4 may be made of a plastics material.

Description and Operation of the First Embodiment

Figure 3A:
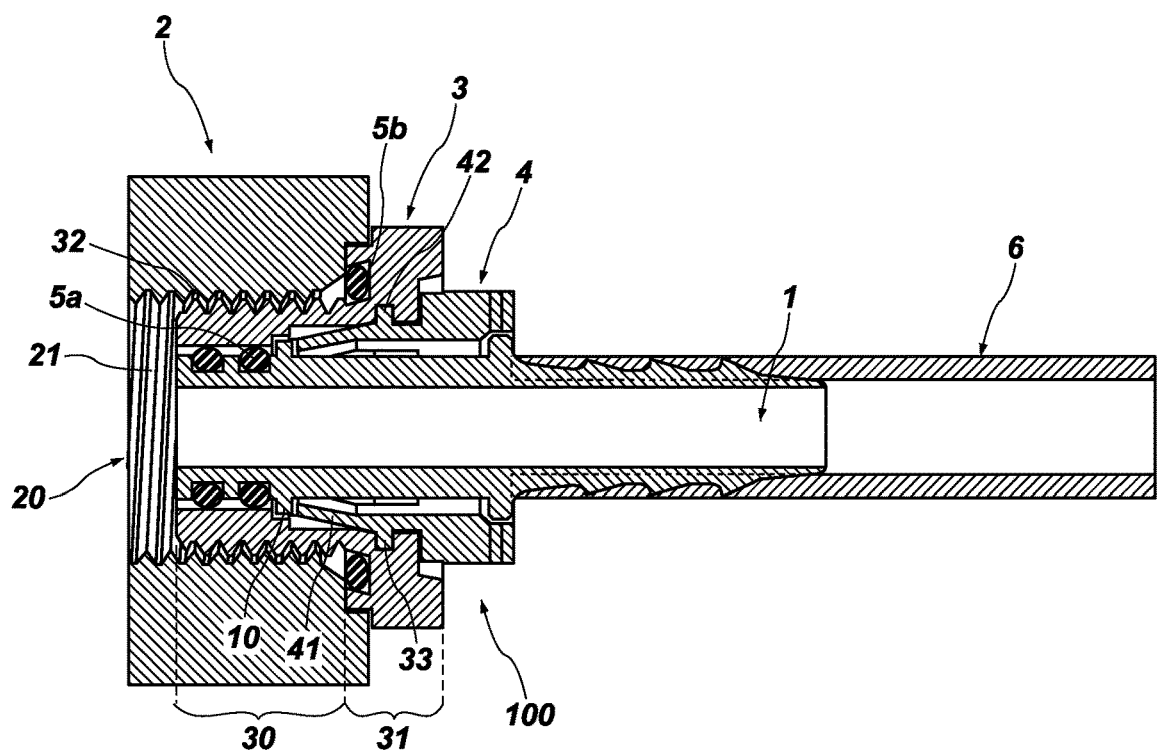
FIG. 3A shows a sectional view of a connection device according to a first embodiment of the present disclosure.

In the first embodiment illustrated in FIGS. 2A and 3A, the retaining means 33 correspond to two notches 35 arranged facing one another and in which the lugs 42 of the ring 4 may engage. It is thus possible to ensure the assembly of the locking ring 4 on the connection end fitting 3 by inserting the flexible longitudinal legs 41 into the end fitting 3 and then engaging the lugs 42 in the notches 35 by rotating the ring 4. Any longitudinal movement of the locking ring 4 is then prevented in this configuration.

Advantageously, the lugs 42 form ribs extending over the entire width of the flexible legs 41. The notches 35 have dimensions that are complementary to those of the lugs 42. This has the effect of improving the resistance to tearing of the locking ring 4 of the connection end fitting 3.

Optionally, to facilitate its assembly on the end fitting 3, the locking ring 4 may comprise at least one indexing pin 44. This pin is intended to slide on the front face of the head 31 when the ring is inserted on the end fitting 3 and driven in rotation, and to be housed in an indexing groove 34 of the head 31 when the lugs 42 are properly engaged in the notches 35. Two indexing pins 44 and two indexing grooves 34 are here arranged so as to present an angular offset of approximately 90° with the flexible legs 41, but it is quite possible to choose any other angular offset.

The assembly of the connection device 100 according to the first embodiment comprises several steps.

A first step involves assembling the locking ring 4 on the connection end fitting 3. For this reason, the flexible legs 41 of the locking ring 4 are inserted into the connection end fitting 3 by angularly orienting the ring 4 so that the flexible legs 41 are not aligned with the notches 35.

A second step involves locking the ring 4 to the connection end fitting 3. To do this, the ring 4 is rotated in order to slide the lugs 42 by rotation in the notches 35. The correct locking of the assembly is confirmed by the housing of the indexing pins 44 in the indexing grooves 34 of the head 31.

A third step, which may be carried out before the first step or after the second step, involves fixing, by screwing, the connection end fitting 3 to the equipment 2 by way of their respective threads 32 and 21.

The fourth and last step involves inserting the tubular connector 1 into the connection device 100 in order to obtain the fluid connection between the duct 6 and the equipment 2. While inserting the connector 1, its collar 10 bears against the flexible legs 41, which tends to deform them. Once the penetration of the collar 10 is completed, for example, in abutment against the inner shoulder of the connection end fitting 3, the flexible legs 41 return to their initial positions, and close on the connector 1. In this configuration, illustrated in FIG. 3A, the collar 10 abuts against the end of the flexible legs 41 if an attempt is made to extract it from the connection device 100.

To demount the connection device 100 of the first embodiment, it suffices to use a conventional tool, for example, an open-end wrench, to apply a rotation to the locking ring 4 and extract the lugs 42 from the notches 35. The locking ring 4 may then be removed from the connection end fitting 3. After the demounting step, the tubular connector 1, still fitted with the locking ring 4, may then be disassembled from the equipment 2.

Description and Operation of the Second Embodiment

Figure 3B:
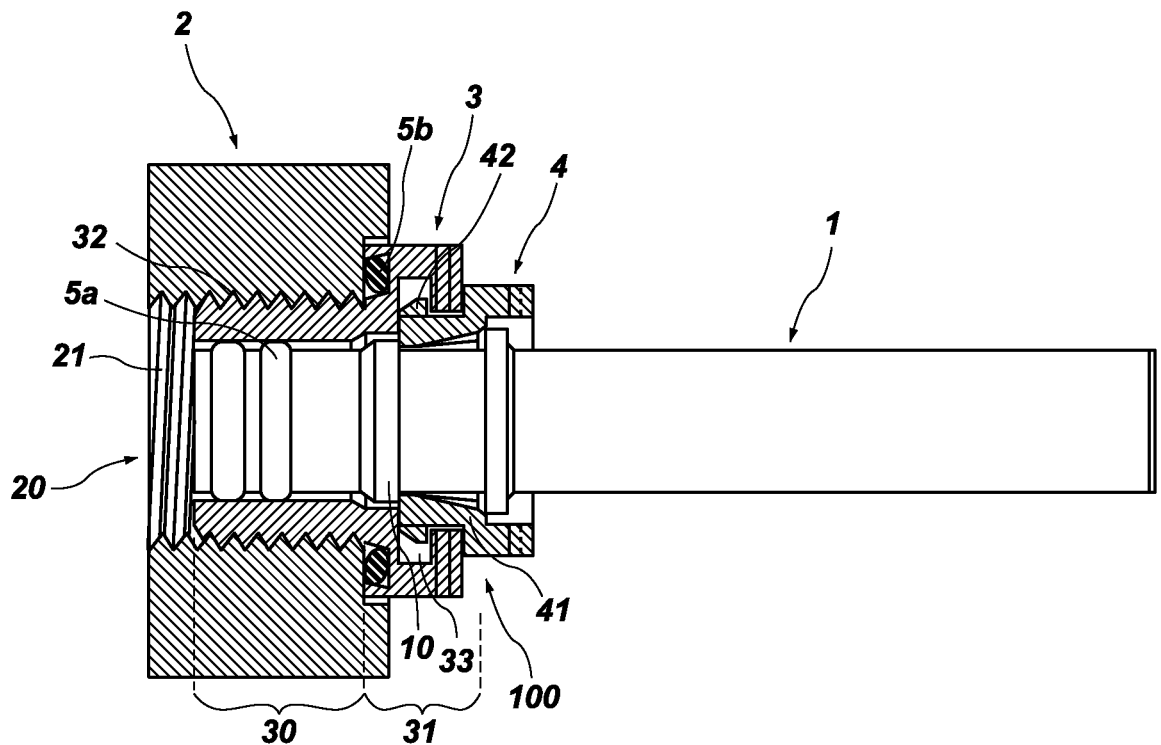
FIG. 3B shows a sectional view of a connection device according to a second embodiment of the present disclosure.

In the second embodiment, shown in FIGS. 1B, 2B, and 3B, the retaining means of the end fitting 3 are formed by an annular groove 33 present over the entire periphery of the inner surface of the head 31. The lugs 42 of the flexible legs 41 may be clipped into the annular groove 33 when inserting the locking ring 4 into the connection end fitting 3. The inner surface of the flexible legs 41 is provided with a stop piece 43 having sliding ramps oriented toward the opening of the ring and intended to facilitate the introduction of the tubular connector 1.

As is clearly visible in FIG. 2B, the head 31 of the connection end fitting 3 comprises notches 35 to receive the lugs 42 of the flexible legs 41. The notches 35 each have an inclined plane to facilitate the clipping of the ring 4 and the insertion of the lugs 42 into the annular groove 33. The number and arrangement of these notches 35 correspond to the number of lugs 42 present on the locking ring 4, which here is four notches 35, the two legs 41 each comprising two lugs 42. Advantageously, the lugs 42 are arranged near the end of the flexible legs 41 in order to facilitate their deformation.

In this embodiment, the annular groove 33 is elliptical in shape, and has a major axis and a minor axis. The flexible legs 41 of the locking ring 4 have an elliptical-shaped cross section of a size substantially equal to that of the groove 33. The flexible legs 41 are arranged at each end of the minor axis of the ellipse. The annular groove 33 does not impede the rotation of the ring 4 and allows the free sliding of the lugs 42 in the groove 33 when the ring 4 is rotated. During this sliding, the stop pieces 43 move apart and come closer to one another depending on whether the flexible legs are arranged in the major axis or the minor axis of the ellipse of the annular groove 33. This mechanism makes it possible to selectively close or open the stop pieces 43 on the collar 10 of the tubular connector 1.

The assembly of the connection device 100 according to the second embodiment comprises steps similar to those described in relation to the first embodiment.

It comprises, in particular, fixing the connection end fitting 3 to the equipment 2 by screwing by way of their respective threads 32 and 21.

During the first step of assembling the ring 4 on the connection end fitting 3, the flexible legs 41 of the ring 4 are inserted into the connection end fitting 3 so that the lugs 42 are aligned with the notches 35. A pressure force is then applied to the ring 4 to force the deformation of the legs 41 through the interaction of the lugs 42 with the inclined sides of the notches 35 and to clip these lugs 42 into the annular groove 33. In this assembly position, the flexible legs 41 are kept close to each other so that the distance separating the stop pieces 43 arranged on the inner surfaces of these legs is less than the diameter of the collar 10. The flexible legs 41, however, remain free to deform to allow the introduction of the collar 10 of the tubular connector 1. At the end of this step, the ring 4 is therefore integral with the connection end fitting 3 and may no longer be removed therefrom. The connection device 100 is then in a so-called "closed" configuration.

Figure 4A:
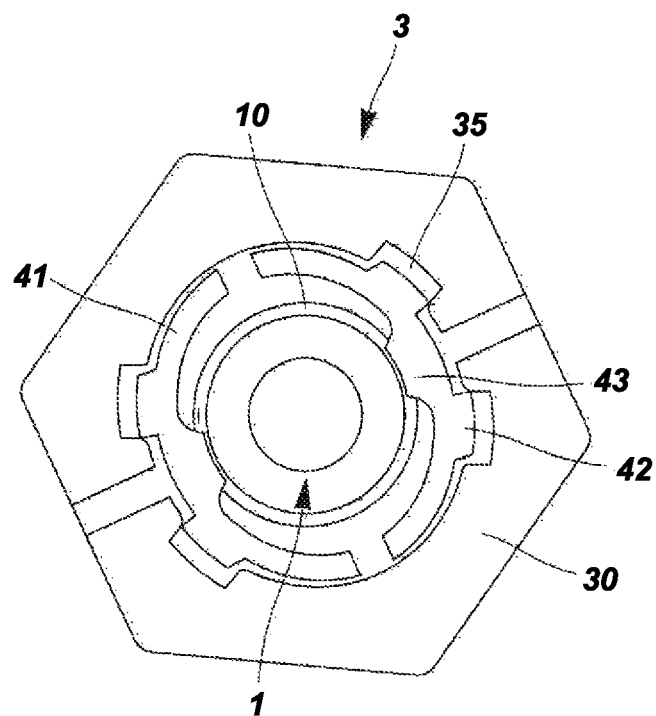
FIGS. 4A and 4B respectively show the connection device according to a second embodiment in a closed configuration and an open configuration.

When inserting the connector 1, its collar 10 bears against the flexible legs 41, and, in particular, on the sliding ramps of the stop pieces 43, which tends to deform these legs to move them away from one another. Once the penetration of the collar 10 is completed, for example, in abutment against the inner shoulder of the connection end fitting 3, the flexible legs 41 return to their initial positions, and close on the connector 1. In this configuration, illustrated in FIGS. 3B and 4A, the collar 10 abuts against the ends of the stop pieces 43 carried by the flexible legs 41 if an attempt is made to extract it from the connection device 100.

Figure 4B:
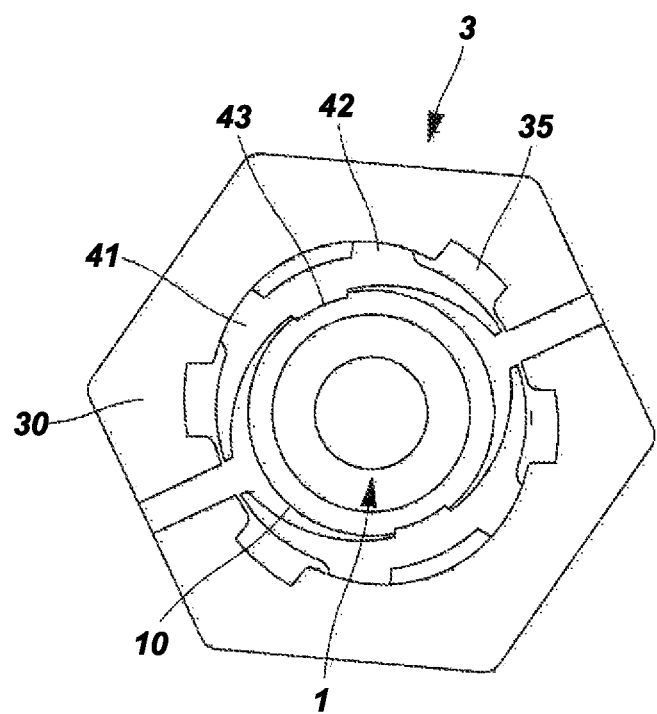

To demount the connection device 100, a rotation of approximately 90° is applied to the locking ring 4 in the example shown. The rotation of the ring 4 drives the lugs in the elliptical groove 33 in the direction of the major axis of this groove, which tends to release the deformation of the flexible legs 41 so that they move away from each other while matching the elliptical shape of the groove. In this so-called "open" configuration illustrated in FIG. 4B, the distance separating the stop pieces 43, arranged on the inner surfaces of legs 41, is greater than the diameter of the collar 10. The pieces are therefore no longer in abutment on the collar 10 of connector 1. It is therefore possible to disassemble the male connector 1 from the female connector 2 while keeping the ring 4 assembled on the connection end fitting 3.

In this second embodiment, the tubular connector 1 may be disassembled from the equipment 2 while leaving the connection device 100 assembled.

Naturally, the present disclosure is not limited to the embodiments described, and it is possible to add variant embodiments without departing from the scope of the invention as defined by the claims.

In particular, although here it has been indicated that the locking ring 4 comprises two flexible legs 41, it is quite possible to adapt the connection device 100 to comprise a larger number of flexible legs 41. The number of lugs 42 and their arrangements on the flexible legs, as well as the angle of rotation allowing the connector 1 or the ring 4 to be demounted, may similarly be adapted.

The invention claimed is:

1. A connection device for connecting a tubular connector to an item of equipment comprising a passage therein, the tubular connector defining a longitudinal direction and including an annular collar, the connection device comprising:
   a connection end fitting configured to connect to the passage of the item of equipment, the connection end fitting having a tubular body and a head having an opening leading into the tubular body and comprising an elliptical annular groove defining an ellipse having a major axis and a minor axis; and
   a locking ring including two flexible longitudinal legs configured to be inserted into the connection end fitting, each of the two flexible longitudinal legs having an elliptical-shaped cross section, an inner surface, an outer surface, and a free end, the outer surface carrying at least one lug configured to clip into the annular groove to keep the locking ring integral with the connection end fitting, the two flexible longitudinal legs capable of deforming and closing on the tubular connector when the tubular connector is introduced longitudinally into the locking ring while the two flexible legs are arranged opposite each other on the minor axis of the ellipse.

2. The connection device of claim 1, wherein the tubular body has an outer thread to secure the connection end fitting to the passage in the item of equipment.

3. The connection device of claim 2, wherein the head of the connection end fitting comprises notches for receiving the lugs.

4. The connection device of claim 3, wherein the two flexible longitudinal legs have stop pieces on inner surfaces of the two flexible longitudinal legs.

5. The connection device of claim 4, wherein the flexible legs are configured to move away from one another as the locking ring is rotated and the two flexible longitudinal legs move from the minor axis of the ellipse toward the major axis of the ellipse.

6. The connection device of claim 1, wherein the head of the connection end fitting comprises notches for receiving the lugs.

7. The connection device of claim 1, wherein the two flexible longitudinal legs have stop pieces on inner surfaces of the two flexible longitudinal legs.

* * * * *